United States Patent Office 3,086,019
Patented Apr. 16, 1963

3,086,019
2,3-BIS(TRIFLUOROMETHYL)QUINOXALINE
Leonard O. Moore and Jared W. Clark, Charleston, W. Va., assignors to Union Carbide Corporation, a corporation of New York
No Drawing. Filed Nov. 1, 1960, Ser. No. 66,405
1 Claim. (Cl. 260—250)

This invention relates to a novel fluorine containing compound and the method of preparing it.

More particularly, this invention relates to 2,3-bis(trifluoromethyl)quinoxaline and the method of preparing it.

The novel compound of this invention is prepared by reacting perfluorobiacetyl with o-phenylene diamine.

The reaction of this invention can be illustrated by the following equation:

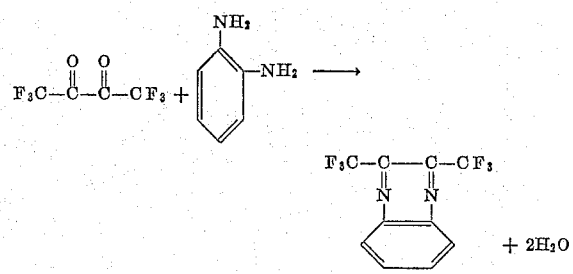

The temperature at which the reaction is carried out is not narrowly critical. Temperatures within the range of 0° and lower to 200° C. and higher are operable. The preferred temperature is 90° C.

The reaction will proceed in the absence of a solvent but, for ease of control, the use of a solvent is desired. The solvent is not narrowly critical and any liquid inert under the reaction conditions can be employed. Examples of solvents include water, ethers, alcohols, benzene, hexane, acetone, etc. The preferred solvent is water.

The proportion of diamine to perfluorobiacetyl is not narrowly critical. The preferred mol ratio is 1.5:1.

The novel compound of this invention can be used as a nematocide or as an intermediate in the synthesis of other biologically active compounds.

The following example illustrates the invention:

A 0.5 gram portion of perfluorobiacetyl was heated with 1.0 gram of o-phenylene diamine in about 10 ml. of water at 90° for 1 hour. The mixture was filtered while hot and the solids washed with water, recrystallized from ethanol, and dried. This gave white crystals of 2,3-bis(trifluoromethyl)quinoxaline, M.P. 117–117.5° C.

What is claimed is:
2,3-bis(trifluoromethyl)quinoxaline.

References Cited in the file of this patent

Ruggli et al.: Helv. Chim. Acta., vol. 29 (1946), pp. 95–101.
Ruggli et al.: Helv. Chim. Acta., vol. 29 (1946), pp. 101–113.
Bost: J. Amer. Chem. Soc., vol. 70 (1948), pp. 903–5.